Feb. 18, 1969     E. E. BUZZA     3,428,401
FLAME PHOTOMETER
Filed Oct. 28, 1964
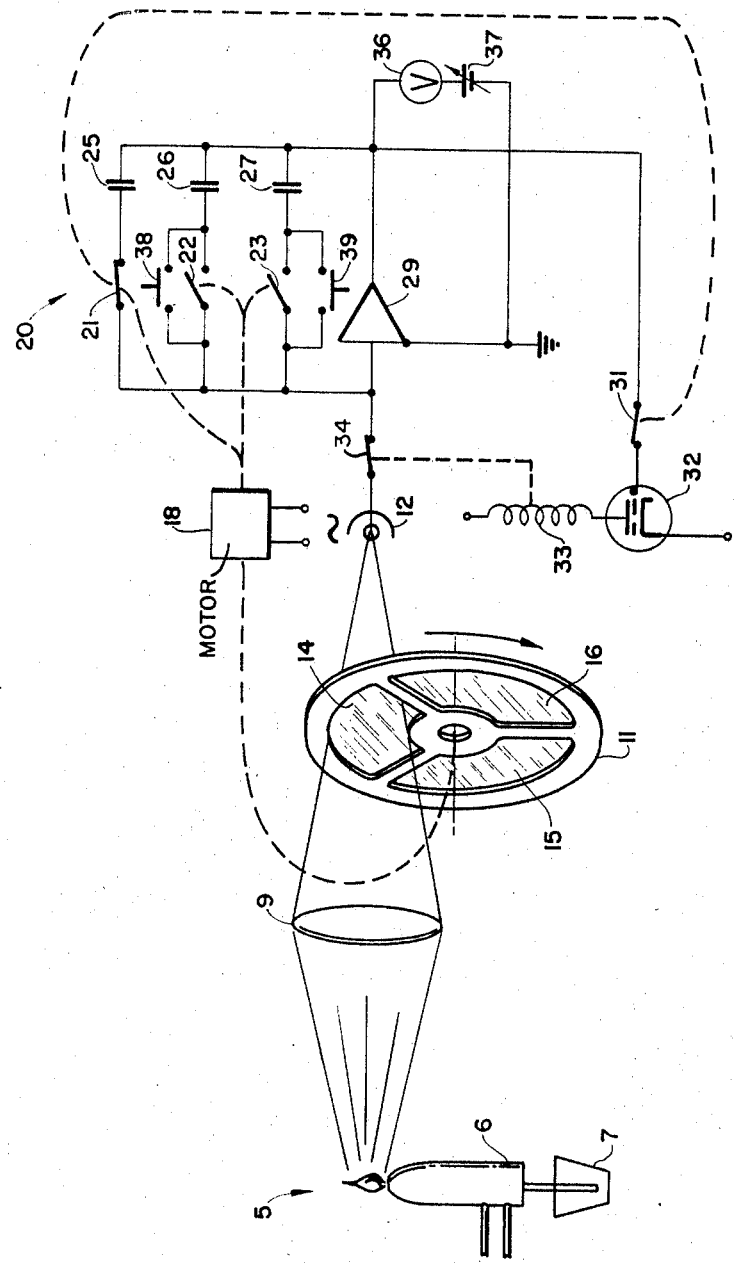
INVENTOR.
EDMUND EARL BUZZA
BY
*Paul L. Harder*
ATTORNEY United States Patent Office 3,428,401
Patented Feb. 18, 1969

3,428,401
FLAME PHOTOMETER
Edmund Earl Buzza, Fullerton, Calif., assignor to Beckman Instruments, Inc., a corporation of California
Filed Oct. 28, 1964, Ser. No. 407,040
U.S. Cl. 356—187                    9 Claims
Int. Cl. G01n 21/58; G01j 3/36

ABSTRACT OF THE DISCLOSURE

The specification discloses a multi-channel flame photometer utilizing an internal standard or reference such as lithium to control the integration time. A solution containing the known concentration of the standard or reference and unknown concentrations of one or more other elements is excited in a flame. A rotating filter wheel is interposed between the flame and a radiant energy detector and successively passes the characteristic emission line of the excited elements. Different capacitors are connected across the input and output terminals of a high gain amplifier in synchronism with the rotating filter wheel to provide separate integration channels for each of the elements of the solution, such channels timesharing a single amplifier. The integrated value of the internal standard is monitored and the integrating circuit interrupted when the integrated value of the internal standard reaches a predetermined level. A non-destructive readout is also provided.

---

This invention relates generally to flame photometry and more particularly to a flame photometer capable of the rapid determination of the concentration of a plurality of substances. While the invention described herein has many advantages for use in colorimeters, spectrophotometers, fluorometers, nephelometers and other instruments where a comparison is made with a standard it will be described in detail for use in a flame photometer.

Approximately 70 elements may now be quantitatively determined through use of their atomic spectrum. While the invention described herein may be utilized to determine any one or more of these elements it is particularly useful in the quantitative analysis of various liquids in respect to one or more substances therein, for example, the analysis of blood serum for sodium, potassium or calcium or for all of these elements. To perform such an analysis, one may either utilize an internal standard or reference, such as lithium, and quantitatively determine, for example, sodium by transmitting the radiation to photosensitive devices one of which is responsive only to the lithium spectral line and the other responsive only to the sodium spectral line. By comparing or ratioing the responses of the photosensitive devices the concentration of sodium may be determined. In such a system matched photosensitive devices must be utilized and it is necessary to provide reference and sample channels in the optical and electrical portions of the instrument. Further, it is impossible in such a system to simultaneously analyze for both sodium and potassium in the blood serum unless still a third optical and electrical channel is utilized.

It is also possible, utilizing a single channel photometer, to calibrate the instrument using samples of known concentration of sodium or potassium and then directly measure the intensity of the spectral line of the element to be analyzed. Although the time from calibration to analysis of the sample may be relatively short it is obvious that variations in flame temperature, detector sensitivity and other variations within the instrument may and do occur which affect the ultimate accuracy of the analysis. It is further obvious that in such a system that sodium and potassium may not be simultaneously determined from a single sample.

In the use of flame photometers or spectrophotometers care must be taken to minimize or compensate for short term variations in flame emission, such as flame "flicker" or "sputter," which may arise from changes in sample flow rate, fuel flow rate or air flow rate if individual analysis of samples is to be meaningful. Further, long term variations, such as the change from day to day of the flame temperature, sensitivity differences in the detector and long term aging of the components of the system, must be taken into account and the instrument must be recalibrated at frequent intervals.

It is an object of the present invention to provide a radiation comparison system that is capable of the simultaneous quantitative analysis of one or more substances in a sample, that may be calibrated to read directly in concentration of that element or elements and that automatically compensates for short and long term variations in source emission, detector sensitivity differences, sample flow rate and sample dilution accuracy.

To accomplish the foregoing a single detector, multichannel flame photometer is provided in which detector means is provided to successively, in more or less rapid succession, sense the intensity of the spectral lines of the one or more elements to be quantitatively analyzed and of an internal standard or reference. The resultant electrical signal is demodulated to separate the signals resulting from the individual spectral lines. The individual signals are then integrated in separate channels and the integration is terminated when the internal standard or reference reaches a preselected value. The potentials stored in each of the integration channels is read on a meter calibrated directly in concentration.

Other objects and many of the attendant advantages of this invention will become more readily appreciated by those skilled in the art as the same becomes better understood by reference to the following detailed description when considered in connection with the accompanying drawing which is a schematic diagram of an illustrative preferred embodiment of a flame photometer constructed according to the teachings of this invention.

Referring now to the single figure in detail, the apparatus of the present invention comprises generally a source means 5 which may include a burner 6 and a sample container 7 arranged in such a manner that the sample within the container is atomized and introduced into the flame. In the description of the apparatus it shall be presumed that the quantitative analysis is for sodium and/or potassium in blood serum and in such case lithium is added to the sample of blood serum to provide a known concentration of lithium such that it may be utilized as an internal standard or reference.

As is well known, thermal excitation of chemical elements causes them to emit discrete and characteristic frequencies of radiation the intensity of which is a function of the concentration of the element within the sample. By selecting discrete line spectra the unknown elements within a sample may not only be identified but quantitatively analyzed. For example, the characteristic principal emission lines of sodium, lithium and potassium which, in the case of sodium is the characteristic yellow line at 589 m$\mu$ and the characteristic red lines of lithium and potassium at 671 m$\mu$ and 766 m$\mu$ respectively, may be utilized in the analysis of blood for sodium and potassium.

Radiation from the flame is focused by lens 9 on a detection device which successively senses the intensity of the various spectral lines and produces an electrical output signal proportional to the incident radiation. The detector device may conveniently comprise a rotating filter wheel 11 and a suitable radiation detector 12 such as a photomultiplier. The filter wheel contains a plurality of filters having maximum wavelength transmittance at the principal emission lines of the elements to be analyzed. In the instant embodiment three filters are utilized. The reference or lithium filter 14 has its maximum transmittance at 671 mμ while sodium and potassium filters 15 and 16 have maximum transmittance at 589 and 766 mμ respectively. Filter wheel 11 is driven in the direction indicated by the arrow by motor 18. It is apparent that as filter 11 is rotated the principal spectral lines of the elements to be determined are successively focused on the detector and the output of photomultiplier 12 is an electrical signal which has, presuming that each of the elements lithium, sodium and potassium are present in the sample, first, second and third components whose amplitudes are respectively proportional to the intensity of the principal spectral lines of lithium, sodium and potassium.

The output of the photomultiplier tube is applied to a demodulation and integrating system generally indicated at 20. Switches 21, 22 and 23 are driven in synchronism with filter 11 by motor 18 in such a manner that switch 21 is closed when the reference or lithium filter 14 is interposed between the flame and photomultiplier 12, switch 22 closes during the period when the sodium filter 15 is interposed between the flame and the photomultiplier tube and switch 23 is closed when the potassium filter 16 passes the energy from the flame to the photomultiplier tube. Capacitors 25, 26 and 27 are respectively connected by switches 21, 22 and 23 between the input and output terminals of high gain amplifier 29 to form, when respective switches are closed, separate integrating circuits for each of the components of the photomultiplier output signal. By this synchronous demodulation of the resultant electrical signal, the separate signals resulting from the individual wavelengths as selected by the filters may be integrated and stored respectively across capacitors 25, 26 and 27. It is apparent that by time sharing amplifier 29, only a single amplifier is necessary even though the demodulation and integrating network 20 has effectively three channels. The particular form of demodulation switches 21, 22 and 23 forms no particular part of this invention and may conveniently be constructed of magnetic reed switches activated by a permanent magnet driven by the same motor as filter disc 11. By operating switches 21–23 with the same motor utilized to drive the filter disc 11 variations in motor speed do not affect the system but only vary the integration time.

A fourth switch 31 is operated in synchronism with switch 21 and allows the lithium reference capacitor 25 to be monitored by thyratron 32 which is biased by a stable reference voltage to a point that requires any desired period of integration, generally about 20 to 30 seconds, in the lithium channel. When the potential on lithium capacitor 25 reaches a predetermined voltage, thyratron 32 fires and operates relay 33 to open switch 34 interposed between photomultiplier 12 and demodulation and integrating circuit 20 to thereby terminate the integration in all channels. Switches 21, 22 and 23 are disconnected from the circuit by another thyratron operated relay not shown.

A non-destructive read-out is provided in the form of meter 36 connected in series with variable potential source 37 across the output of amplifier 29. The voltages acquired by the sodium and potassium capacitors 26 and 27 may be read by sequentially switching them across the amplifier by any suitable means such, for example, as by normally open, manually operated switches 38 and 39 connected to bypass demodulating switches 22 and 23. Any suitable means may be provided, but has not been shown for the sake of simplicity, for discharging capacitors 25–27 in preparation for a subsequent sample run.

In operation, motor 18 rotates filter 11 at approximately 1700 r.p.m. and the resultant signal components from the detector after demodulation are integrated in respective channels until the reference capacitor reaches a preselected value. By the use of a single detector the necessity of matching or selecting sensitivities of two or more detector smonitoring the flame is eliminated. By the rapid, successive inetrposition of the filter in the beam path from the flame to the detector possible emission differences in the flame and sensitivity differences in the detector between the signals obaitned for the various wavelengths is minimized. By integrating over a sufficient length of time random variations in the emission of the flame are cancelled and a high signal-to-noise ratio is obtained. Further, if the integration period is approximately 25 seconds and the motor speed is 1700 r.p.m., approximately 700 bits of information for each wavelength channel is provided and any error due to termination of the integration period when a different filter is positioned in the beam other than the one in the beam upon initiation of the period will only be approximately 0.14%. By utilizing low-leakage capacitors and time sharing a single amplifier the absolute sensitivity of the amplifier in terms of gain, frequency response and noise is constant for all channels.

Meter 36 may be calibrated for sodium and potassium in a known manner always using a given concentration of the internal standard and always integrating for a period of time sufficient to allow the lithium reference capacitor to reach a predetermined value, say 32 volts. Variable potential source 37 may be utilized to balance background current to set the zero point when the sample contains no sodium or potassium. By integrating each sample until the reference capacitor has reached a predetermined value, the ratio of the voltage on a particular capacitor is to the concentration of the element as the ratio of the voltage on that same capacior bore to the known concentration of that element. Thus, having once calibrated the meter 36, except for long term calibration errors, the instrument need not recalibrated from time to time since the internal standard determines the time period over which the integration is performed. That is, if in some subsequent experiment the temperature of the flame is less so that the energy emitted by the spectral line of lithium is less or if the sample flow rate diminishes due to low accumulation of deposits in the atomizer capillary, the integration takes place over a longer period of time but always until the same voltage representing the same concentration of lithium is present across the reference capacitor.

While the invention has been described in connection with the analysis of blood serum for sodium and potassium utilizing lithium as an internal standard it is apparent that the instrument may be likewise utilized in the quantitative analysis of other elements and may utilize other standards. Further, it is apparent that the system may be provided with more than three channels.

It should also be understood that the embodiment described in detail is given by way of illustration only and not by way of limitation and many modifications and variations thereof are present without departing from the spirit and scope of the invention as defined by the appended claims. For example, in certain other radiation comparison systems it is generally the practice to provide alternate reference and sample signals and to compare these signals to determine an optical characteristic of an unknown. In these systems it is frequently the practice to provide some means of maintaining the reference signal constant. It is possible to modify certain of these instruments after the teachings herein and to integrate the reference and sample signals over a period of time required for the reference signal to reach a predetermined integrated value and then compare the integrated sample and reference signals.

What is claimed is:
1. In a flame photometer for the quantitative analysis of a plurality of elements in a solvent containing an internal standard of known concentration and having a source means for simultaneously atomizing and introducing said elements and said standard into a flame to produce their characteristic atomic spectral lines, the improvement comprising:
  detector means producing an output signal proportional to the intensity of the instantaneous incident radiation;
  means directing successively and repeatedly over short periods of time the spectral lines of said elements and said standard to said detector means;
  means connected to said detector means for demodulating said output signal and separately integrating the components thereof over a period of time necessary for the integrated value of said internal standard to reach a preselected value; and
  means connected to said demodulating and integrating means for measuring the integrated values of each of said plurality of elements.

2. In a flame photometer for determining the concentration of an unknown element in a solvent containing an internal standard of known concentration and having source means for simultaneously atomizing and introducing said element and said standard into a flame to produce their characteristic atomic spectral lines, the improvement comprising:
  detector means producing an output signal proportional to the intensity of the instantaneous incident radiation;
  means directing successively and repeatedly over short periods of time the spectral lines of said elements and said standard to said detector means;
  means connected to said detector means for demodulating the output signal and separately integrating the components thereof indicating the unknown element and said internal standard, said integration being over a period of time necessary for the integrated value of said internal standard to reach a preselected value; and
  means connected to said demodulating and integrating means for reading the integrated value of the component indicating said unknown element.

3. In a flame photometer for the quantitative analysis of a plurality of elements in a solvent containing an internal standard of known concentration and having a source means for atomizing and introducing said elements and said internal standard into a flame to simultaneously produce their characteristic atomic spectrum, the improvement comprising:
  a radiation detector producing an electrical signal output that is a function of the instantaneous incident radiation;
  filter means including a plurality of filters for selectively transmitting the characteristic spectral line of said elements and said standard;
  means for rapidly interposing in succession and repeatedly said filters between said flame and said detector over short periods of time;
  means connected to said detector and operated in synchronism with said last named means for demodulating the output signal of said detector and providing a plurality of electrical signals each having an amplitude proportional to the intensity of the spectral line of a separate element;
  means connected to said detector and said demodulating means for integrating and storing each of said electrical signals over a period of time necessary for the integrated value of the signal indicating said internal standard to reach a preselected value; and
  means connected to said integrating and storing means for measuring the integrated value of each of said components.

4. In a flame photometer for the quantitative analysis of a plurality of unknown elements in a solvent containing an internal standard of known concentration and having source means for atomizing and introducing said solvent into a flame to simultaneously produce the characteristic atomic spectrum of said elements and said internal standard, the improvement comprising:
  radiant energy detecting means producing an electrical signal output proportional to the intensity of the instantaneous radiation impinging thereon;
  rotating filter means interposed between said flame and said detector and including a plurality of filters for selectively transmitting characteristic spectral lines of said unknown elements and said internal standard;
  means connected to said detecting means for demodulating the output of said detector and separately integrating the individual components thereof indicating the amplitude of said elements and said internal standard over a period of time necessary for the integrated value of said internal standard to reach a preselected value; and
  means connected to said demodulating and integrating means for measuring the integrated value of each of said components indicating said unknown elements.

5. In a flame photometer for the quantitative analysis of a plurality of unknown elements in a solvent containing an internal standard of known concentration and having source means for atomizing and introducing said solvent into a flame thereby simultaneously producing the characteristic atomic spectral lines of said unknown elements and said internal standard, the improvement comprising:
  detector means producing an output signal proportional to the intensity of the instantaneous incident radiation;
  means directing successively over short periods of time the spectral lines of said elements and said internal standard to said detector means;
  means connected to said detector means for demodulating said output signal to produce a first component proportional to the intensity of the spectral line of said internal standard and a plurality of components indicating, respectively, the intensity of the spectral lines of each of said unknown elements;
  means connected to said detector means and said demodulating means for integrating each of said components, said means including a single time-shared amplifier and a plurality of capacitors each storing the integrated value of a single component of said output signal;
  means connected to said integrating means for sampling the integrated value of said first component and terminating the integration of all of said components when said first component reaches a predetermined value; and
  nondestructive readout mans connected to said integrating means for reading the value of each of said plurality of components whereby the concentration of each of said unknown elements may be directly indicated.

6. In a flame photometer for the quantitative analysis of at least one unknown element in a solvent containing an internal standard of known concentration and including a source means for atomizing and introducing said solvent into a flame thereby to simultaneously produce the characteristic atomic spectrum of said unknown and said internal standard, the improvement comprising:
  a radiation sensitive detector producing an output signal having an amplitude proportional to the intensity of the incident radiation;
  rotatable filter means including at least first and second filters interposed between said flame and said detector, said first filter transmitting a principal spectral line of said unknown element and said second filter transmitting a principal spectral line of said internal standard;
  means to rotate said filter whereby said detector produces an output having a first component proportional to the amplitude of the intensity of the spectral line of said unknown element and a second component having an amplitude proportional to the intensity of the spectral line of said internal standard;
  first and second integrating and storage means;

an amplifier connected to said detector;

means connecting successively said first and second integrating and storage means across said amplifier in synchronism with said first and second filters;

means connected to said amplifier and said integrating and storage means for sampling said second integrating and storage means and terminating the integration when the stored value reaches a predetermined amount; and means connected to said amplifier for measuring the voltage stored in said first integrating and storage means thereby to directly indicate the concentration of said unknown element.

7. In a flame photometer for the quantitative analysis of at least a pair of unknown elements in a solvent containing an internal standard of known concentration and having source means for simultaneously atomizing and introducing said unknown elements and said standard into a flame to thereby simultaneously produce their characteristic atomic spectral lines, the improvement comprising:

detector means positioned to sense the radiant energy from said flame and produce an electrical signal output proportional to the intensity of the instantaneous incident radiation;

first, second and third filter means for transmitting respectively a spectral line of said pair of unknown elements and said internal standard;

means interposing said filter means successively for short periods of time between said flame and said detector;

an amplifier connected to said detector;

first, second and third capacitors;

means connecting said first, second and third capacitors successively in an integrating circuit with said amplifier in synchronism with the interposition of said first, second and third filter means between said flame and said detector whereby the output of said detector indicative of each of said unknown quantities and said internal standard is integrated and stored across a separate capacitor;

means connected to said amplifier and said connecting means for sampling the value of the capacitor corresponding to said internal standard and terminating said integration when said value reaches a predetermined amount; and means connected to said amplifier for separately measuring the values stored across said other capacitors.

8. In a radiation comparison system for measuring the intensity of a sample beam including a source and means for providing alternate reference and sample beams, the improvement comprising:

detector means having an output proportional to the intensity of the instantaneous incident radiation and producing an output reference signal proportional to the intensity of the reference beam and an output sample signal proportional to the intensity of the sample beam;

means connected to said detector means for integrating said reference and sample signals, said means including a single, time-shared amplifier and a plurality of storage means periodically connected between the input and output of said amplifier for storing the integrated value of said reference and sample signals;

means connected to said integrating means for sampling the integrated value of said reference beam and terminating the integration of said reference and sample signals when said integrated reference signal reaches a predetermined value; and non-destructive readout means connected to said integrating means for reading the value of said sample signal.

9. In a flame photometer of the type having means for atomizing and introducing a sample into a flame wherein said sample includes an unknown quantity of at least one element and a known quantity of at least one other element, the improvement comprising:

a detector;

means for sequentially directing to said detector radiation from said elements whereby said detector produces an electrical signal having a plurality of components equal to the number of elements in said sample with selective components having an amplitude proportional to the intensity of the radiation from said element of which said radiation is characteristic;

an amplifier having its input connected to said detector and an output;

a plurality of storage means;

means periodically connecting individual ones of said plurality of storage means between said input and output of said amplifier in synchronism with respective components of said electrical signal thereby to form for each of said elements a distinct integrating channel, each of said channels time-sharing said amplifier;

circuit means connected between the input and output of said amplifier for sensing the integrated value of the component indicative of the element of known quantity and interrupting the input to said amplifier when said component reaches a preselected value; and means connected to said amplifier for selectively measuring the values across each of said storage means.

References Cited

UNITED STATES PATENTS

| | | | |
|---|---|---|---|
| 2,675,734 | 4/1954 | Hasler et al. | 88—14 |
| 2,823,577 | 2/1958 | Machler | 88—14 |
| 2,885,926 | 5/1959 | Molloy | 88—14 |
| 3,171,882 | 3/1965 | Baird | 88—14 |
| 3,171,882 | 3/1965 | Bairol | 88—14 |
| 3,211,050 | 10/1965 | Pelavin | 88—14 |

JEWELL H. PEDERSEN, *Primary Examiner.*

F. L. EVANS, *Assistant Examiner.*

U.S. Cl X.R.

250—226, 233; 356—81, 87